United States Patent [19]

Yamamoto

[11] Patent Number: 4,852,904
[45] Date of Patent: Aug. 1, 1989

[54] VEHICLE SUSPENSION SYSTEM

[75] Inventor: Tadanobu Yamamoto, Higashi-Hiroshima, Japan

[73] Assignee: Mazda Motor Corporation, Hiroshima, Japan

[21] Appl. No.: 173,161

[22] Filed: Mar. 25, 1988

[30] Foreign Application Priority Data

Mar. 26, 1987 [JP] Japan .................................. 62-72575

[51] Int. Cl.$^4$ .......................... B60G 3/00; B60G 19/04
[52] U.S. Cl. ...................................... 280/701; 280/690
[58] Field of Search ............... 280/701, 703, 711, 690, 280/691, 700, 724; 267/287, 291

[56] References Cited

U.S. PATENT DOCUMENTS

| 4,245,853 | 1/1981 | Inoue et al. | 280/701 |
| 4,621,830 | 11/1986 | Kanai | 280/690 |
| 4,652,009 | 3/1987 | Ando et al. | 280/701 |
| 4,720,121 | 1/1988 | Kikuchi et al. | 280/701 |

FOREIGN PATENT DOCUMENTS

61-48808  4/1986  Japan .

Primary Examiner—Richard A. Bertsch
Attorney, Agent, or Firm—Fleit, Jacobson, Cohn, Price, Holman & Stern

[57] ABSTRACT

A rear suspension system comprising a rear differential gear mechanism for transmitting a driving force to rear wheels through rear axles, a suspension support member for supporting the rear differential gear mechanism, a pair of front lateral links extending horizontally and transversely, and a pair of rear lateral links extending horizontally and transversely at rear positions of the front lateral links respectively, the inner end of each of the lateral links being swingably connected to the suspension support member and the outer end of each of the lateral link being connected to a wheel carrier for carrying the wheel. The system further comprises elastic device mounted between a vehicle body and the suspension support member, and the elastic device having a non-linear load-deformation property so as to obtain both a desirable controllability under a high driving force condition and a stable drivability under a low driving force condition.

17 Claims, 6 Drawing Sheets

VEHICLE SUSPENSION SYSTEM

BACKGROUND OF THE INVENTION

1. Field of the Invention

The present invention relates to a vehicle suspension system and more particularly to a rear suspension system in which a toe direction control of the wheels can be accomplished by a unique structure thereof including support members, lateral links and the like.

2. Prior art

A suspension system is employed for a motor vehicle so as to prevent the vibration of the wheels from transmitting to the vehicle body or passengers. For this purpose, in Japanese Patent Publication No. 56-47008 published on Nov. 6, 1981 for opposition, there is disclosed a suspension system in which a suspension support structure is provided with a bush of a unique structure mounted between a vehicle body and a suspension support member for improving a vibration absorbing effect. The bush of the suspension system is adapted to be compressed in the up and down direction so as to absorb a vibration of the wheel wherein the coefficient of elasticity of the bush is changed in accordance with the amount of the deformation thereof.

In a motor vehicle, it has been known to provide a suspension system for controlling a toe direction of a wheel. For instance, Japanese Utility Model Publication No. 59-966 published for opposition on Jan. 12, 1984 and corresponding to U.S. Pat. No. 4,245,853, discloses a rear suspension system for suppressing a toe-out movement of the wheel during a turning operation of the vehicle so as to obtain a driving stability. The suspension system disclosed in the Japanese Utility Model Publication No. 59-966 is provided with a tension rod extending longitudinally and two lateral arms extending transversely, one ends of the rod and arms being connected to a suspension support member and the other ends of the rod and arms being connected to a vehicle body.

The lateral arms are connected to the suspension support member through an elastic bush in such a manner that a toe-in movement of the wheel is produced when a side force acts on the wheel.

Further, in Japanese Utility Model Public Disclosure No. 61-48808 laid open to the public on Apr. 2, 1986, there is disclosed a suspension system in which link members are connected swingably in the up and down direction with opposite ends of a suspension cross member at one ends thereof respectively and the other ends of the link members are connected to the right and left wheels respectively. In the disclosed suspension system, the suspension cross member is connected with a vehicle body through a pair of elastic shock absorbing members having different elasticities which are positioned so as to be spaced from each other in the longitudinal direction of the vehicle. The shock absorbing member of the front side is smaller in rigidity than the rear side shock absorbing member so that a toe-in movement is produced in the wheel when a side force acts on the wheel.

Meanwhile, in some vehicles, specifically so called front heavy vehicle in which an engine is mounted at the front side thereof, as a driving force for the wheels is increased, there is produced an under steer action or a power-under trend to deteriorate steering controllability of the vehicle. Although an adequate power-under trend is preferable in terms of a steering stability, it would be undesirable when the trend is too intensified. This problem will be critical specifically in so called four-wheel drive vehicles in which all four wheels can be driven by the engine.

It should be noted however that the conventional suspension system can not accomplish a proper toe-control in response to the magnitude of the driving force for the wheels.

SUMMARY OF THE INVENTION

It is therefore an object of the present invention to provide a suspension system which can suppress a power-under steer trend of the toe direction to provide a desirable controllability in a driving region of a high driving force for the wheel.

It is another object of the present invention to provide a suspension system which can restrict a change in the toe direction of the wheel to provide a stable drivability of the vehicle in a driving region of a low driving force for the wheel.

It is still further object of the present invention to provide a rear suspension system which can suppress a power-under steer trend for a four-wheel drive vehicle.

According to the present invention, the above and other objects of the invention can be accomplished through the provision of a rear suspension system for a motor vehicle comprising a rear differential gear mechanism for transmitting a driving force to rear wheels through rear axles, a suspension support member for supporting the rear differential gear mechanism, a pair of front lateral links extending horizontally and transversely, and a pair of rear lateral links extending horizontally and transversely at rear positions of the front lateral links respectively, the inner end of each of the lateral links being swingably connected to the suspension support member and the outer end of each of the lateral links being connected to a wheel carrier for carrying the wheel characterized in that the suspension system further comprises elastic means mounted between a vehicle body and the suspension support member, and in that the elastic means has a non-linear load-deformation property.

When a motor vehicle is driven by an engine driving force, the driving force is transmitted from the wheels to the road surface. At the same time, a counterforce from the road surface acts on the wheels. The counterforce is transmitted to the differential gear mechanism, specifically to a differential gear case and then to the suspension supporting member which supports the gear mechanism wherein the counterforce acts on the suspension support member through the differential gear case in such a manner that the suspension support member is dragged downwardly at the rear side thereof with respect to the rotation axis of the differential gear mechanism for the rear axle. As a result, when the driving force from the engine is transmitted to the wheel the inner end of the front lateral link moves upwardly while the inner end of the rear lateral link moves downwardly because the inner ends of both the front and rear lateral links are connected to the suspension support member.

In this connection, the elastic means disposed between the suspension support member and the vehicle body does not produce a substantial deformation until the driving force for the wheel reaches a predetermined magnitude.

In other words, the load-deformation property of the elastic means is non-linear.

In order to obtain such a non-linear load-deformation property of the elastic means, the elastic means may be mounted on the vehicle with a pre-load so that the elastic member does not produce a substantial deformation until a force acting on the elastic means exceeds the pre-load in the case where the counterforce acts on the wheels.

When the vehicle is in a turning operation, the vehicle is bumped so that the vehicle body including the suspension support member is lowered relative to the outer wheel in the turning operation. As a result, the inner ends of both the front and rear lateral links which are connected to the suspension support member swing downwardly around the outer ends thereof. In this case, the amounts of movement of the inner ends of the front and rear lateral links are substantially the same. Since the front lateral link is moved swingably upwardly at the inner end by the counterforce against the driving force, the downward movement resulting from the bumping action in the turning operation results in reduction of the amount of the downward movement of the inner end of the front lateral link.

On the other hand, the inner end of the rear lateral link moves downwardly at the inner end and upwardly at the outer end thereof when subjected to the counterforce from the road surface. The downward movement of the inner end of the rear lateral link in the bumping action of the turning operation is added to the downward movement of the inner end based on the counterforce against the driving force to increase the amount of the downward movement of the inner end of the rear lateral link. It will be therefore understood that the rear lateral link swings downwardly around the outer end thereof in comparison with the front lateral link with regard to the outer wheel in the turning operation of vehicle. As a result, the outer end of the rear lateral link moves transversely inwardly relative to the outer end of the front lateral link so that the rear side of the wheel is dragged inwardly relative to the front side thereof. Thus a toe-out movement is produced in the wheel.

The amount of the toe-out movement of the wheel depends on the magnitude of the driving force acting on the wheel because of the elasticity of the elastic means disposed between the vehicle body and the suspension support member.

In a case where the elastic means has a non-linear load-deformation property, the toe-direction change in the wheel is suppressed when the driving force is low while it is increased non-linearly when the driving force is high.

According to the present invention, under a high driving force condition, the suspension system provides the wheel with an adequate toe-out movement so as to suppress a power-under steer trend and obtain a desirable controllability.

On the other hand, under a low driving force condition, the suspension system restrains a toe-direction change to provide the vehicle with a stable drivability.

Above and other features of the present invention will be apparent from following description of preferred embodiments taking reference to the accompanying drawings.

DESCRIPTION OF THE PREFERRED EMBODIMENTS

Figure 1:
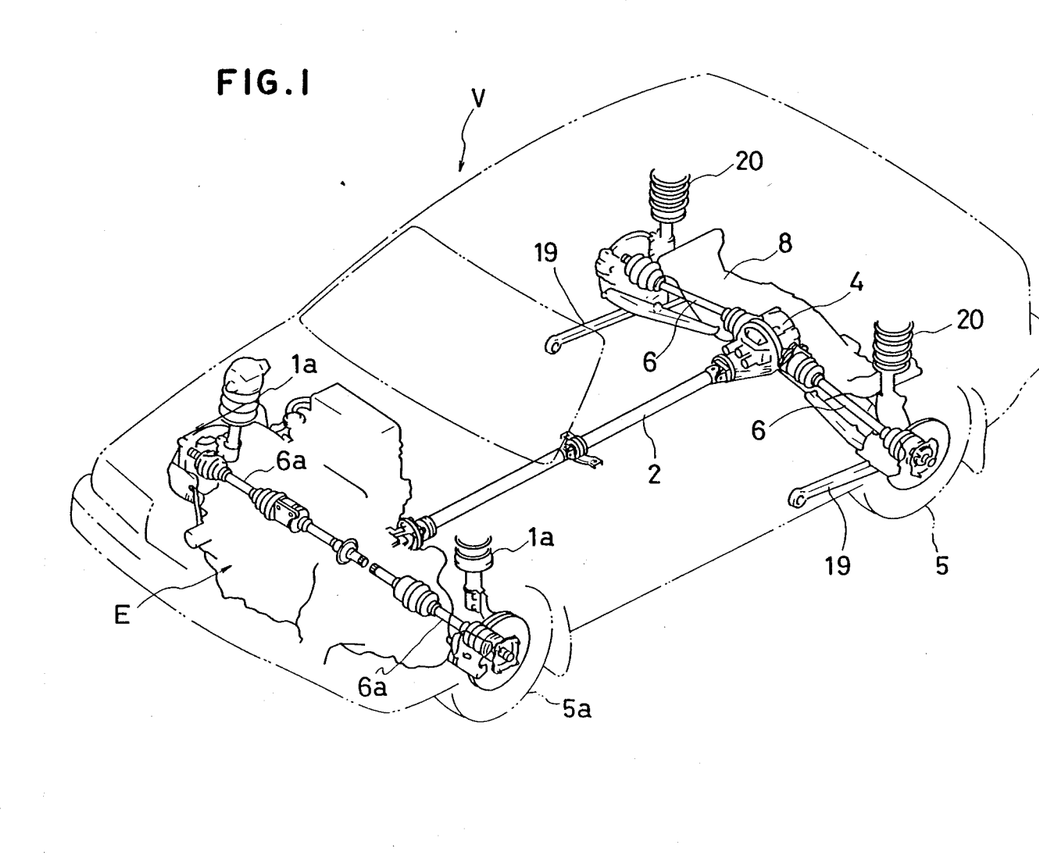
FIG. 1 is a schematic perspective view showing a four-wheel drive motor vehicle to which a suspension system in accordance with the present invention can be applied.
Figure 2:
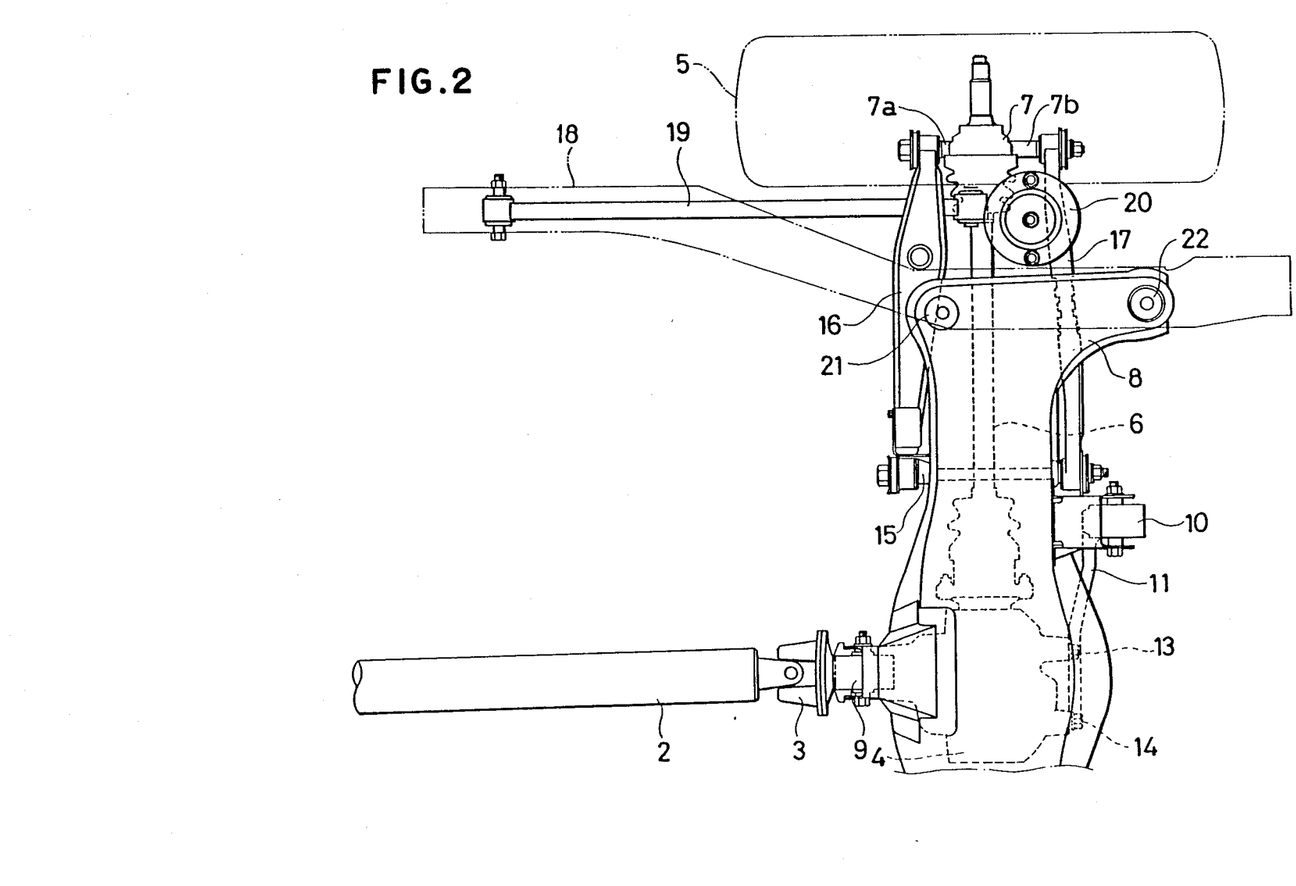
FIG. 2 is a plan view of a suspension system in accordance with present invention.

Referring to the drawings, particularly to FIG. 1, there is shown a motor vehicle V provided with a front suspension system 1a and a rear suspension system 1 according to the present invention. The illustrated motor vehicle V is of a four-wheel drive and provided with an engine E at the front side thereof and front wheels 5a connected to front axles 6a. Referring additionally to FIG. 2 the motor vehicle V is provided with a propeller shaft 2 connected to the engine E through a transmission (not shown) and extending rearwardly, and a differential gear mechanism (not shown) connected with the rear end of the propeller shaft 2 through a universal joint 3. The differential gear mechanism is covered by a differential gear case 4.

The differential gear mechanism is located at the intermediate position of a straight line connecting a right and left rear wheels 5 (only the right wheel is shown). A rear axle 6 extending transversely is connected to the right rear wheel 5 through a wheel support member 7 for transmitting a driving force from the engine E to the wheel 5.

Over the differential gear case 4 and the axle 6, there is disposed a suspension support member or suspension cross member 8 extending in the transverse direction of the vehicle V. The cross member 8 is connected through an elastic device 9 with the differential gear case 4 at a front edge and transversely middle portion thereof. A bracket is connected with the rear edge portion of the cross member 8 through an elastic device 10. The bracket 11 is joined to the rear side of the gear case 4 by means of bolts 13 and 14. The elastic devices 9, 10 function as shock absorbers and have an elastic coefficient rigid enough to restrain an effect on to a toe direction control. Thus, in the embodiment, the cross member 8 and the differential gear case 4 can move together as far as a suspension mechanism for the toe control is concerned.

A supporting rod 15 extending in the longitudinal direction of the vehicle is mounted on a lower end portion of the cross member 8 with the supporting rod being located just at the outer side of the elastic device 10. At the opposite ends of rod 15, front and rear lateral links 16 and 17 are swingably connected at the inner end portions thereof in the up and down direction. The outer end portions of the front and rear lateral links are swingably connected in the up and down direction with arm portions 7a and 7b formed on the wheel supporting member 7 respectively. To the wheel supporting member 7 connected is a rear end portion of a link member 19 extending longitudinally and secured to a body frame 18 at a front end portion. Further, on the wheel supporting member 7 is mounted a lower end portion of a strut assembly 20.

In the above structure, the cross member 8 is secured to the vehicle body through a pair of front elastic devices 21 and a pair of rear elastic devices 22. The front elastic device is located at the front side of the rotation axis of the differential mechanism for the axle 6 while the rear elastic device 22 is located the rear side thereof.

Figure 3:
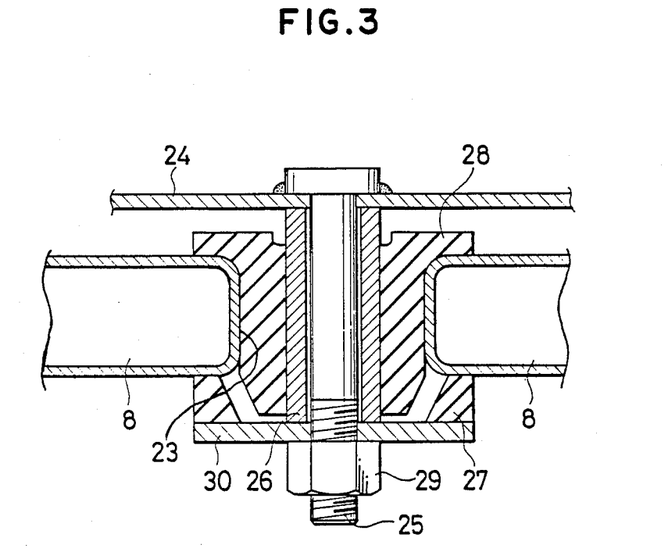
FIG. 3 is a sectional view of an elastic device employed for the present invention.

Referring to FIG. 3, there is shown a sectional view of the front elastic device 21.

The cross member 8 is constituted to form a closed cross section by a panel member. The cross member 8 is formed with a hole 23 on which the front elastic device 21 is mounted. A bolt 25 fixed to a body panel 24 at one end and is inserted into a spacer 26 and extended through the hole 23. Bushes 27 and 28 are mounted around the spacer 26 and secured to the body panel 24 by a nut 29 through a plate member 30 wherein the cross member 8 is elastically carried by the bushes 27 and 28 so that the cross member 8 can be secured to the body panel 24 through the bushes 27 and 28.

The bush 27 is pre-compressed when the vehicle V is assembled.

Figure 4:
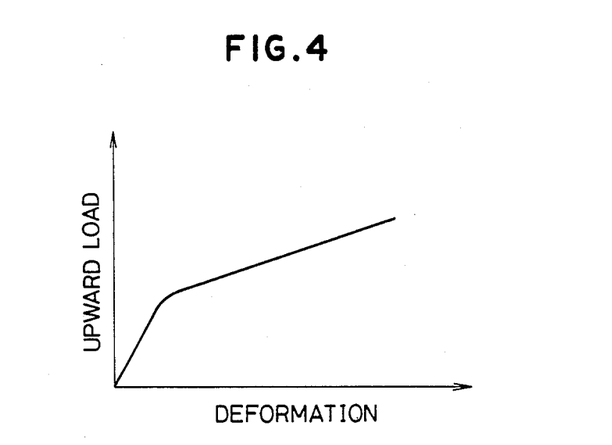
FIG. 4 is a graphical representation of a load-deformation property of the elastic device of FIG. 3.

It will be therefore understood that the elastic coefficient of the bush 27 is high when the bush deforms downwardly in FIG. 3. In order to move the cross member 8 upwardly in FIG. 3, a great force is needed until the bush 27 is released from the pre-compressed state thereof. Once the pre-load is removed from the bush 27, the cross member 8 can move easily. There is shown in FIG. 4 a relationship between the amount of the deformation of the elastic device 21 and a load acting thereon.

Figure 5:
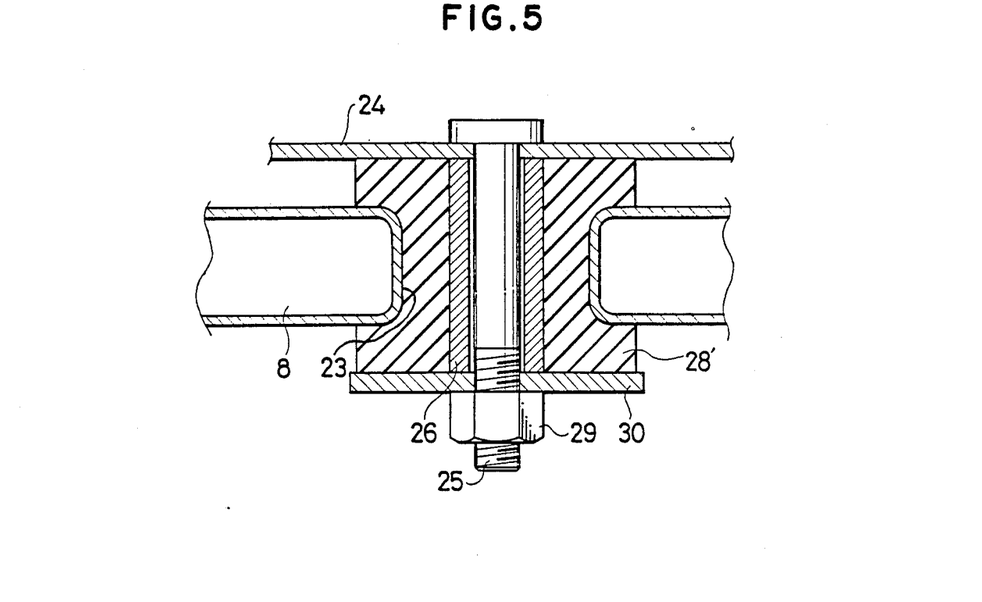
FIG. 5 is a sectional view of an elastic device employed for the present invention.
Figure 6:
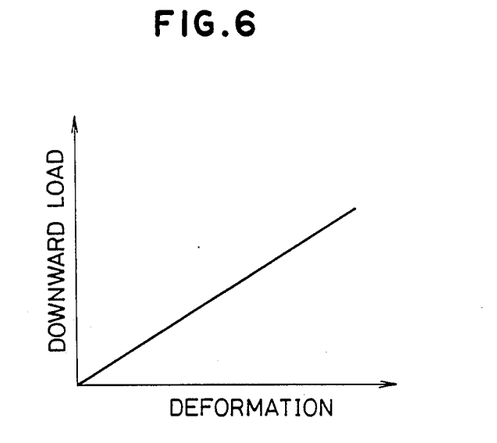
FIG. 6 is a graphical representation of a load-deformation property of the elastic device of FIG. 5.

There is shown in FIG. 5 a sectional view of the rear elastic device 22. In this structure, the cross member 8 is carried by a single elastic member 28' unlike the front elastic device 21 and the elastic member 28' is not pre-compressed. Thus, a load-strain property of the elastic member 28' is linear as shown in FIG. 6.

Hereinafter there is described an operation of the suspension system of the illustrated embodiment.

Figure 7:
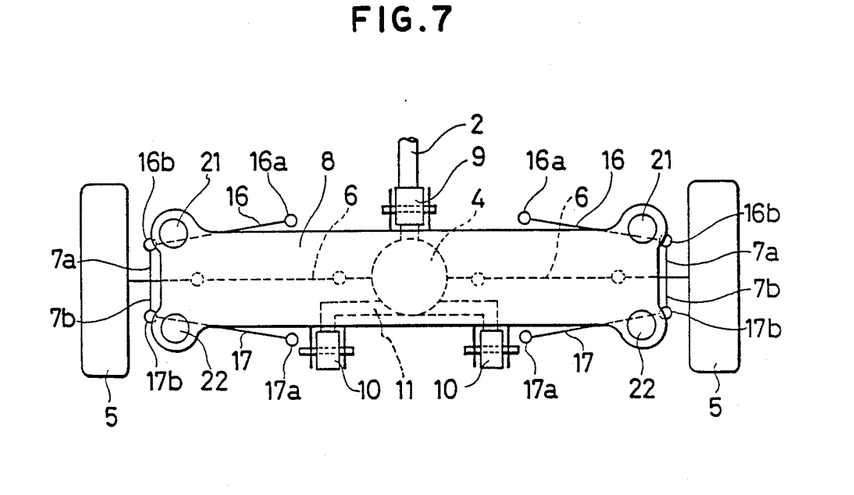
FIG. 7 is a plan view showing a skeleton of the suspension system of FIG. 2.
Figure 8:
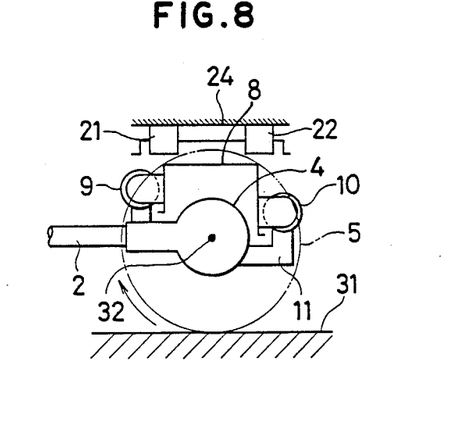
FIG. 8 is an elevational view of the suspension system of FIG. 7.

For convenience of the explanation, there are employed FIG. 7 and 8 which show skeletons equivalent to the suspension mechanism shown in FIG. 2.

Referring to FIG. 7 and 8, the rear wheel 5 is subjected to a counterforce from a road surface 31 in the clockwise direction as shown in FIG. 8 by an arrow against a driving force transmitted from the engine E to the wheel 5 when the vehicle is running. The counterforce is transmitted to the cross member 8 through the gear case 4 and the elastic device 9. As a result, the front side of the cross member 8 is subjected to a force which causes the cross member 8 to move upwardly while the rear side thereof is subjected to a force which causes the cross member 8 to move downwardly. Thus, the front and rear lateral links which are connected to the front side and the rear side of the cross member 8 at the inner end connections 16a and 17a move in a different way respectively. The connection 16a of the front lateral link 16 moves upwardly while the connection 17a of the rear lateral link 17 moves downwardly.

In the turning operation of the vehicle, the outer side of the turning vehicle is bumped down so that the vehicle body is lowered against the wheel 5 of the outer side. As a result, the lateral links 16 and 17 swing downwardly around the outer end connections 16b and 17b.

In this case, the inner end connection 17a of the rear lateral link 17 is dragged downwardly in addition to the downward movement resulting from the counterforce against the driving force. To the contrary, the counterforce acts on the front lateral link 16 to drag the inner end connection 16a upwardly in a direction of negating the downward movement of the inner end connection 16a of the front lateral link 16. Therefore, the amount of the swinging movement of the front lateral link 16 is smaller than that of the rear lateral link 17. This movement of the front and rear lateral links 16 and 17 causes the wheel 5 to produce a swinging movement in a horizontal plane, i.e. a toe direction change wherein the front side of wheel 5 moves outwardly relative to the rear side of thereof. In other words, the wheel 5 produces a toe-out movement.

As aforementioned, the bush 27 of the illustrated elastic device 21 is pre-compressed so that the deformation of the bush 27 is substantially restricted until the magnitude of the driving force reaches a predetermined value. Therefore, when the vehicle is under a driving condition in which the driving force acting on the wheel 5 is low, the above toe-out movement is suppressed. Then, when the driving force is increased more than the certain value, a proper toe-out movement produces within an elastic region of the bush 27.

It will be therefore understood that an abrupt toe direction change is restrained under a low driving force to obtain a stable drivability, and that a desirable toe-out trend in the wheel 5 is produced under a high driving force to suppress a power-under steering trend thereby preventing the controllability from deteriorating.

An alternative elastic device of a non-linear load-deformation property as shown in FIG. 4 may be employed as a rear elastic device in lieu of the elastic device 22 of linear load-deformation property as shown in FIG. 6.

Figure 9:
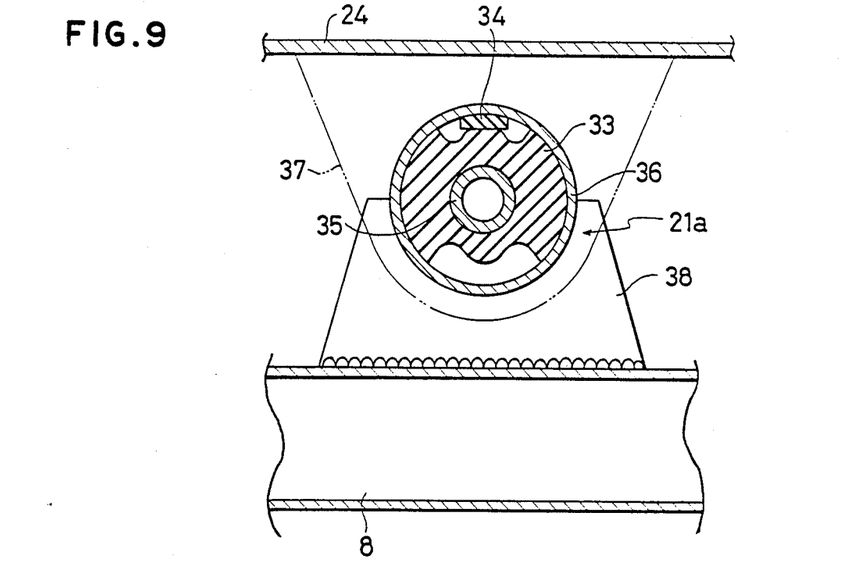
FIG. 9 is a sectional view showing another structure of an elastic device which may be employed for the present invention.

Referring to FIG. 9, there is shown another structure of an elastic device 21a which may be employed for the present invention. The illustrated elastic device 21a is provided with elastic bushes 33 and 34 which are disposed in a space formed between tubular members 35 and 36. The tubular members 35 and 36 are located in a space formed between the body panel 24 and the cross member 8 and extending in parallel with the panel 24 and cross member 8. The tubular members 35 and 36 are combined in a telescopic relationship with each other through the bushes 33 and 34. The inner tubular member 35 is carried by the body panel 24 through a bracket 37 and the outer tubular member 36 is carried by the cross member 8 through a bracket 38. The bush 33 is formed with cut-out portions at an upper and lower end portions. The bush 34 is inserted into the upper cut-out portion to be engaged with the outer tubular member 36 and the bush 33. The bush 34 is pre-compressed when mounted so that the cross member 8 can move easily when the upward force acting thereto exceeds the value of the pre-load causing the pre-compressive deformation of the bush 34. As a result, the elastic device shown in FIG. 8 can deform according to a non-linear load-deformation property as shown in FIG. 4 as well as the elastic device 21. Thus, the elastic device 21a shown in FIG. 9 can be employed for the suspension system in accordance with the present invention in lieu of the elastic device 21.

Figure 10:
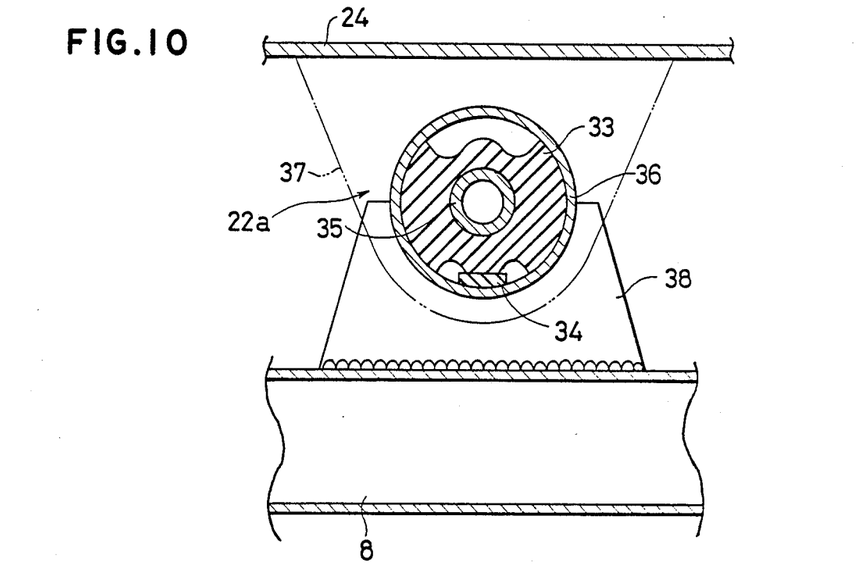
FIG. 10 is a sectional view showing still another structure of an elastic device which may be employed for the present invention.

Referring to FIG. 10, There is shown still another structure of an elastic device 22a. In the illustrated device 22a, the pre-compressed bush 34 is inserted into the lower cut-out portion of the bush 33 unlike the elastic device 21a shown in FIG. 9.

Therefore, the elastic device 22a has a non-linear load-deformation property opposite to the elastic device 21a, that is, the elastic device 22a allows the cross member to move easily downwardly when the driving force exceeds a certain value. Therefore, the elastic device 22a can be employed in lieu of the rear elastic device 22. In this case, the front elastic device 21 can be constituted to have a linear load-deformation property as shown in FIG. 6.

The invention has thus been shown and described with reference to specific embodiments, however, it should be noted that the invention is not limited to the details of the illustrated structures but changes and modifications may be made without departing from the scope of the appended claims.

I claim:

1. A rear suspension system for a motor vehicle comprising:
   a rear differential gear mechanism for transmitting a driving force to rear wheels through rear axles,
   a suspension support member for supporting the rear differential gear mechanism,
   pair of front lateral links extending substantially horizontally and transversely,
   a pair of rear lateral links extending substantially horizontally and transversely at respective rear positions relative to the front lateral links, the inner end of each of the lateral links being swingably connected to the suspension support member and the outer end of each of the lateral links being connected to a wheel carrier for carrying the wheel, and
   a plurality of elastic means disposed between a vehicle body and the suspension support member in a spaced relationship with one another in a longitudinal direction of the vehicle body, at least one of the elastic means having a non-linear load-deformation property in an up and down direction when a reacting force against the driving force transmitted from the wheels acts on the suspension support member through the rear differential gear mechanism.

2. A rear suspension system in accordance with claim 1 in which the elastic means is constituted such that its deformation rate a given increment in a driving force transmitted to the wheel is larger in a vehicle operating condition where the driving force is high than in a vehicle operating condition where the driving force is low.

3. A rear suspension system in accordance with claim 2 in which an engine is mounted on the front side of the vehicle.

4. A rear suspension system in accordance with claim 3 being adapted to apply to a four-wheel drive vehicle.

5. A rear suspension system in accordance with claim 1 a pair of the elastic means are disposed at the opposite ends of the suspension support member in a spaced relationship in the longitudinal direction of a vehicle.

6. A rear suspension system in accordance with claim 5 in which the elastic means are located opposite sides of a rotation axis of the differential gear mechanism respectively.

7. A rear suspension system in accordance with claim 6 in which the front and rear lateral links are disposed opposite sides of the rotation axis of the differential gear mechanism respectively.

8. A rear suspension system in accordance with claim 7 in which a pair of elastic means disposed at opposite end and rear portions of the suspension support member has the non-linear load-deformation property when the rear side of the suspension support member moves downwardly.

9. A rear suspension system in accordance with claim 7 the differential gear mechanism is located at the center in the transverse direction of the vehicle.

10. A rear suspension system in accordance with claim 7 in which a pair of elastic means disposed at opposite end and front portions of the suspension support member has the non-linear load-deformation property when the suspension support member moves upwardly.

11. A rear suspension system in accordance with claim 10 in which a pair of elastic means disposed at opposite end and rear portions of the suspension support member has the non-linear load-deformation property when the rear side of the suspension support member moves downwardly.

12. A rear suspension system in accordance with claim 11 in which the elastic means comprises outer tubular means connected to the suspension support member, inner tubular means disposed telescopically in the outer tubular means and connected to a vehicle body member, a first elastic bush with a pair of cut-out portions at opposite sides in the up and down direction intervened between the outer and inner tubular means for elastically carrying them, and a second elastic bush disposed in the lower cut-out portion of the first elastic bush so as to be engaged elastically with both the first elastic bush and the inner surface of the outer tubular means, the second elastic bush being pre-compressed.

13. A rear suspension system in accordance with claim 10 in which the elastic means comprises bolt means fixed to a vehicle body member and extending through a hole formed on the suspension support member, a set of elastic bushes disposed around the bolt means through spacer means for elastically carrying the suspension support member, plate means mounted on the bolt means for supporting the elastic bushes and nut means connected to the bolt means for carrying the elastic bushes between the body member and the suspension support member, one of the bushes being pre-compressed.

14. A rear suspension system in accordance with claim 10 in which the elastic means comprises outer tubular means connected to the suspension support member, inner tubular means disposed telescopically in the outer tubular means and connected to a vehicle body member, a first elastic bush with a pair of cut-out portions at opposite sides in the up and down direction intervened between the outer and inner tubular means for elastically carrying them, and a second elastic bush disposed in the upper cut-out portion of the first elastic bush so as to be engaged elastically with both the first elastic bush and the inner surface of the outer tubular means, the second elastic bush being pre-compressed.

15. A rear suspension system in accordance with claim 10 in which a pair of elastic means disposed at rear portions of the suspension support member has a linear load-deformation property when the rear side of the suspension support member moves downwardly.

16. A rear suspension system for a motor vehicle comprising:

a rear differential gear mechanism for transmitting a driving force to rear wheels through rear axles, a suspension support member extending transversely for supporting the rear differential gear mechanism, a pair of front lateral links extending substantially horizontally and transversely, a pair of rear lateral links extending substantially horizontally and transversely at respective rear positions relative to the front lateral links, the inner end of each of the lateral links being swingably connected to the suspension support member and the outer end of each of the lateral links being connected to a wheel carrier for carrying the wheel, elastic means mounted between a vehicle body and the suspension support member, the elastic means having a deformation property in which an increment of deformation of the elastic means when the elastic means is subjected to a force displacing the suspension support member upwardly at its front end and downwardly at its rear end is increased as the force displacing the suspension support member is increased.

17. A rear suspension system in accordance with claim 15 in which the elastic means comprises bolt means fixed to a vehicle body member and extending through a hole formed on the suspension support member, an elastic bush disposed around the bolt means through spacer means for elastically carrying the suspension support member, plate means mounted on the bolt means for supporting the elastic bushes and nut means connected to the bolt means for carrying the elastic bush between the body member and the suspension support member.

* * * * *